United States Patent [19]

Yamaoka et al.

[11] Patent Number: 4,867,008
[45] Date of Patent: Sep. 19, 1989

[54] TRAVELING TRANSMISSION CASE

[75] Inventors: Kojiro Yamaoka, Nishinomiya; Shusuke Nemoto, Yao, both of Japan

[73] Assignee: Kanzaki Kokyukoki Mfg., Co. Ltd., Japan

[21] Appl. No.: 928,151

[22] Filed: Nov. 7, 1986

[30] Foreign Application Priority Data

| Nov. 14, 1985 | [JP] | Japan | 60-175885[U] |
| May 15, 1986 | [JP] | Japan | 61-73482[U] |
| May 15, 1986 | [JP] | Japan | 61-73484[U] |
| May 15, 1986 | [JP] | Japan | 61-73483[U] |
| Jul. 25, 1986 | [JP] | Japan | 61-115053[U] |
| Jul. 25, 1986 | [JP] | Japan | 61-115052[U] |

[51] Int. Cl.$^4$ ............................. F16H 57/02
[52] U.S. Cl. ................... 74/606 R; 74/15.2; 180/300; 180/344
[58] Field of Search ............ 74/606 R, 331, 15.2, 74/15.66, 333, 334, 357, 359, 467; 180/70.1, 900; 188/2 R

[56] References Cited

U.S. PATENT DOCUMENTS

| 3,339,662 | 9/1967 | Hanson et al. | 180/54 |
| 3,763,949 | 10/1973 | Freiburger | 74/15.2 |
| 3,766,722 | 10/1973 | Kamlukin et al. | 56/11.6 |
| 4,292,855 | 10/1981 | Murayama | 74/15.66 |
| 4,304,141 | 12/1981 | Tone et al. | 74/15.2 |
| 4,366,724 | 1/1983 | Yamamori et al. | 74/467 |
| 4,414,861 | 11/1983 | Witt | 74/467 |
| 4,498,349 | 2/1985 | Nishihara | 74/15.66 |
| 4,513,834 | 4/1985 | Hayashi et al. | 180/70.1 |
| 4,574,910 | 3/1986 | Miki et al. | 180/900 |
| 4,579,183 | 4/1986 | Irikura et al. | 180/70.1 |
| 4,606,429 | 8/1986 | Kurata | 74/15.2 |
| 4,658,662 | 4/1987 | Rundle | 74/15.2 |

FOREIGN PATENT DOCUMENTS

| 1198158 | 8/1965 | Fed. Rep. of Germany | 74/467 |
| 2558954 | 7/1977 | Fed. Rep. of Germany | 180/900 |
| 0102866 | 6/1983 | Japan | 74/467 |
| 0150821 | 7/1986 | Japan | 180/900 |
| 0160365 | 7/1986 | Japan | 180/900 |

Primary Examiner—Vinh Luong
Attorney, Agent, or Firm—Saidman, Sterne Kessler & Goldstein

[57] ABSTRACT

A transmission formed of aluminum die casting which has disposed therein a differential gear and speed reduction gears. The case is provided at the outer surface thereof with a hydro-static transmission system. The transmission case is divided horizontally into three sections at two planes, one of which passes through the axis of each driving axle of the tractor, the other of which passes through the axes of the speed reduction gears.

14 Claims, 12 Drawing Sheets

TRAVELING TRANSMISSION CASE

BACKGROUND OF THE INVENTION

A conventional transmission for a tractor is disclosed in U.S. Pat. No. 4,513,834 to Hayashi et al. Provided at the side surface of this transmission is a hydro-static transmission (HST) system. This system includes an output shaft, which is inserted into the transmission case, to drive the differential gears of the transmission and subsequently the axles of the tractor.

This transmission however, suffers from many disadvantages which are overcome by the present invention. First, this construction divides the transmission case vertically into two portions; one which houses a speed reduction gear train, and the other houses a differential gear. This construction also includes bearing bores which are made completely circular during a molding process. Hence, it is impossible to use a trimming die for casting the transmission and therefore, mass-produce the same by use of a metallic mold. Additionally, during assembly of the transmission, the worker is required to insert his hands into the transmission case for placement of the gears and their associated shafts.

SUMMARY OF THE INVENTION

An object of the present invention is to provide a traveling transmission for a light tractor or the like which divides the transmission case horizontally, at the lines passing through the axes of gear shafts. Therefore, all the bearing bores are semicircular and the trimming die may be formed by a metallic mold. Thus the conventional inconvenience is eliminated and the transmission case may be continuously mass-produced at a low manufacturing cost by use of a cast-molding machine.

Another object of the present invention is to provide a traveling transmission for a light tractor or the like, which is free from complicated assembling work to fit the shafts into bores, so that the shafts inserted into bearing bores and the cases are assembled in order, thereby enabling an assembling robot to be used, resulting in a low manufacturing cost.

Still another object of the present invention is to provide a traveling transmission used for a light tractor or the like, which utilizes the bearings to position the respective transmission cases during the assembly, thereby ensuring the aforesaid construction.

A further object of the present invention is to provide a traveling transmission for a light tractor or the like, which allows the semicircular bearing bores to meet with each other so that, when the bearings are fixed, the assembly is possible even for a slight error in the bearing bore.

A still further object of the invention is to provide a traveling transmission use for a tractor, which makes it possible to lubricate with separate grease the differential gears and bearings for the axles because they are positioned above the transmission case so as not to be sufficiently supplied with a lubricating oil.

Yet another object of the invention is to provide a traveling transmission for a light tractor or the like, which can attach an oil filter, for the lubricating oil, to the transmission case, when the lubricating oil within the small-sized transmission case constructed as abovementioned, is used as operating oil for the HST system transmission.

Still a further object of the invention is to provide a traveling transmission used for a light tractor or the like, which can dispose a differential locking device, at part of the differential gear, even for such divided transmission cases.

These and other objects of the invention will become more apparent in the detailed description and examples which follow.

DESCRIPTION OF THE PREFERRED EMBODIMENT

Figure 1:
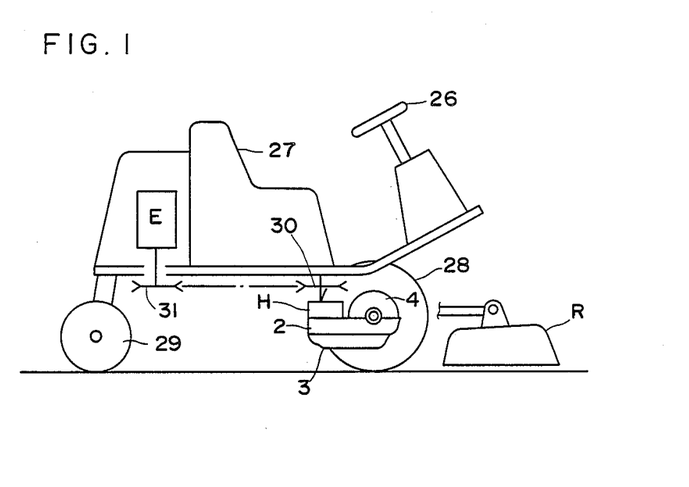
FIG. 1 is a side view of a traveling transmission of the present invention attached to a mower tractor.

FIG. 1 shows a light tractor on which a traveling transmission of the invention is mounted, in which front wheels 28 serve as the driving wheels and rear wheels 29 as the steering wheels to thereby support the tractor body. An engine E, a seat 27, and a steering handle 26 are disposed on the tractor body, a mower R being mounted in front thereof.

The traveling transmission of the present invention is disposed across driving axles 8L and 8R for the front wheels 28 and a V belt is stretched across an output pulley 31 and a V pulley 30 fixed to a HST system transmission H, thereby transmitting a driving force thereto. The HST system transmission H drives the tractor forwardly or backwardly and changes the speed thereof. The rotational speed of the same is reduced by speed reduction gears and transmitted to the driving axles 8L and 8R, thereby driving the front wheels 28 as the driving wheels.

Figure 2:
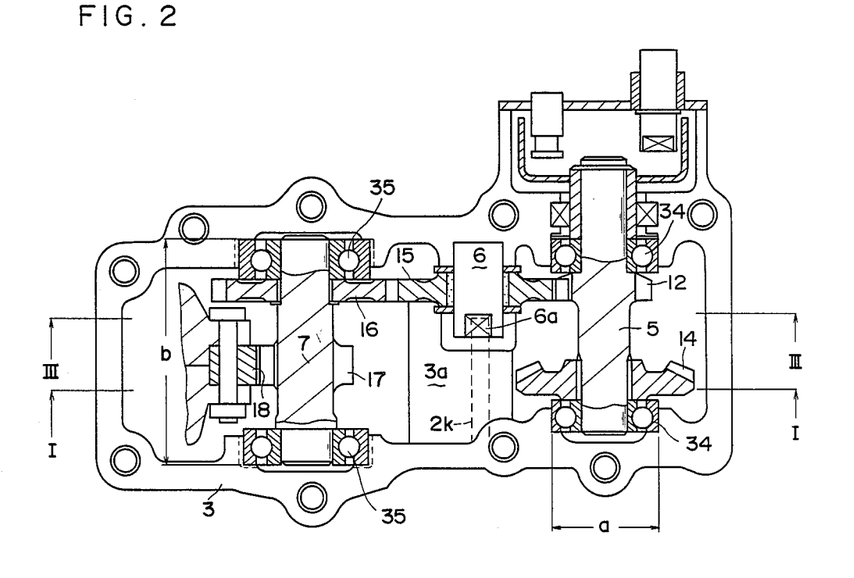
FIG. 2 is a sectional view taken on the line II—II in FIG. 4, showing a lower case of the traveling transmission of the invention.
Figure 3:
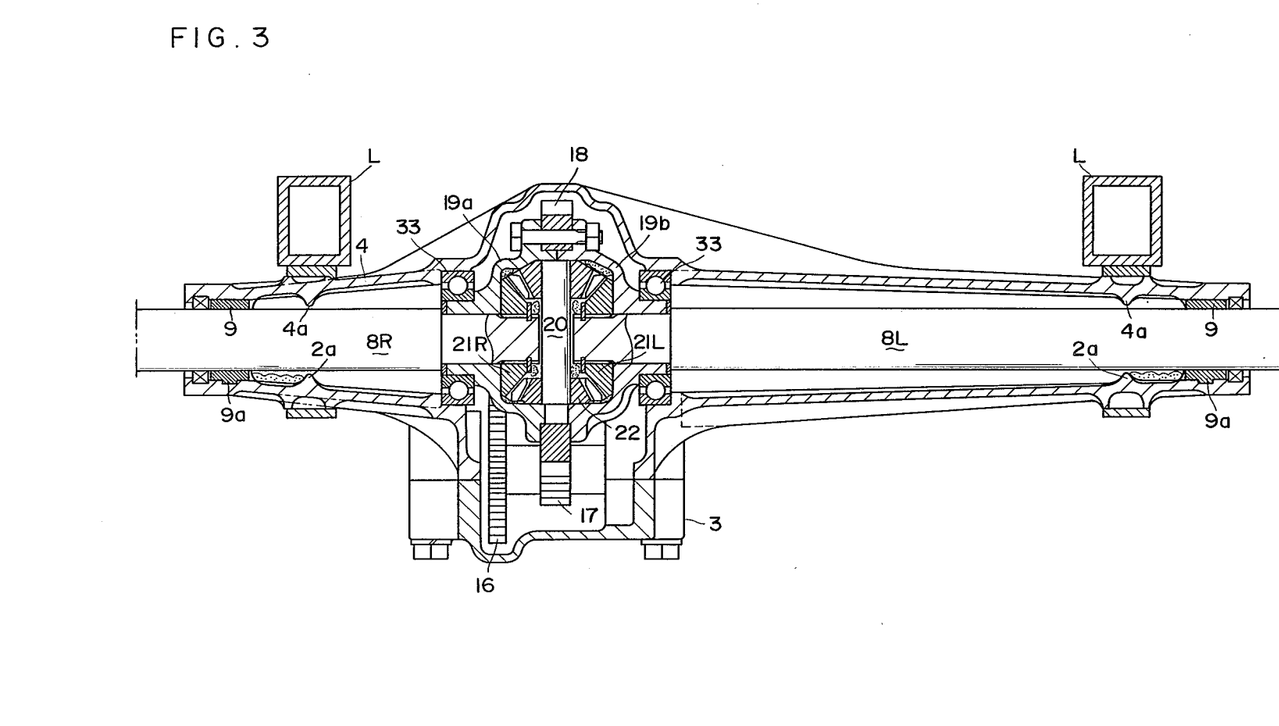
FIG. 3 is a sectional view taken on the line III—III in FIG. 4, showing the differential gears of the invention.
Figure 4:
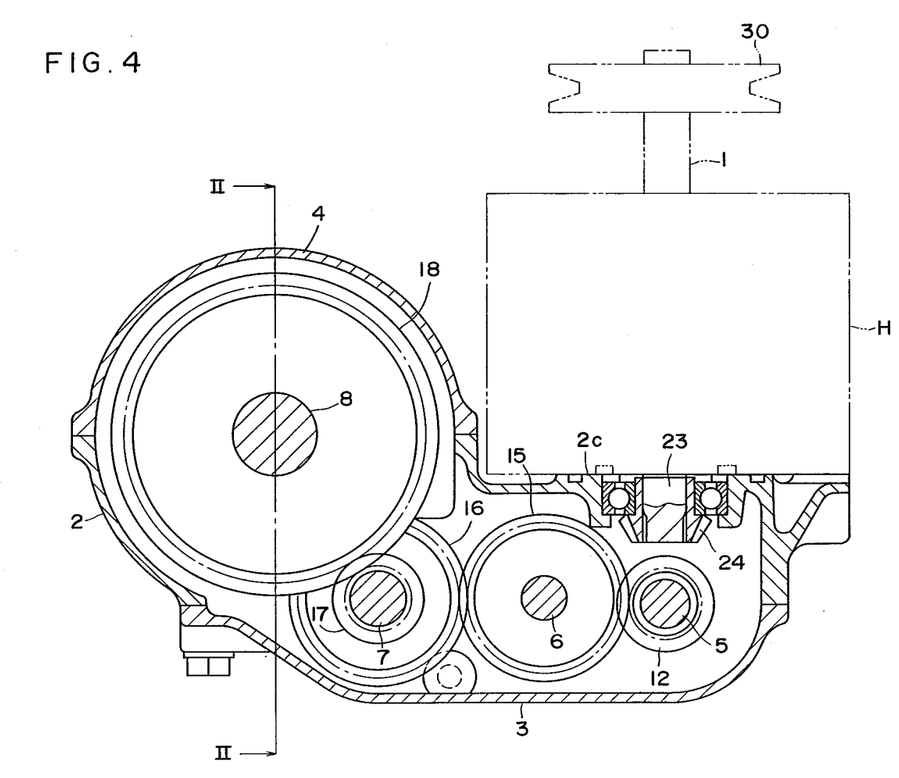
FIG. 4 is a sectional view taken on the line IV—IV in FIG. 3.

FIGS. 2, 3 and 4 are structural views of the entire traveling transmission of the invention.

The traveling transmission of the invention combines three caes or sections of an upper case 4, an intermediate case 2 and a lower case 3, so as to form a transmission case, so that bearings for rotatably supporting the shafts are put between the joint faces of the respective cases.

A HST system transmission H is placed on the upper surface of a loading portion 2C formed adjacent the junction of the intermediate case 2 with the upper case 4. The rotation of engine E is transmitted to the V pulley 30 fixed to a shaft 1 of a hydraulic pump at the HST system transmission H. An angle of a swash plate in the hydraulic pump driven by the shaft 1 thereof is changed by a speed change lever (not shown) so as to change a discharge amount, thereby changing rotation of a hydraulic motor.

The rotation of the hydraulic motor after the speed change is transmitted to the speed reduction gears through a hydraulic motor shaft 23 entering from the loading portion 2 to the intermediate case 2.

The speed reduction gears are disposed on a plurality of gear shafts received within a space between the lower or second opening L of the intermediate case 2 and the upper opening of the lower case 3.

Also, the speed reduction gears are so constructed that a bevel gear 24 fixed to the hydraulic motor shaft 23 engages with a bevel gear 14 on a first shaft 5 to transmit the driving force thereto, a fixed gear 12 the first shaft 5 engages with a free-fitting gear 15 on a second shaft 6, the free-fitting gear 15 engages with a fixed gear 16 on a third shaft 7, and another fixed gear 17 thereon engages with a ring gear 18 at the differential transmission, thereby transmitting the driving force thereto.

Then, the driving force is transmitted to the differential gear disposed between a lower opening of the upper case 4 and an upper or first opening U of the intermediate 2.

The differential gear is constructed as shown in FIG. 3.

A differential gear case 19 comprises a left-hand case 19a and a right-hand gear case 19b abutting against each other, so that the ring gear 18 and a differential pinion shaft 20 are fixedly sandwiched between the abutting surfaces of both the cases 19a and 19b. Differential pinions 22 are freely-fitted on the differential pinion shaft 20 and engage with left-hand and right-hand differential side gears 21L and 21R engaging with a left-hand axle 8L and a right-hand axle 8R respectively.

Figure 5:
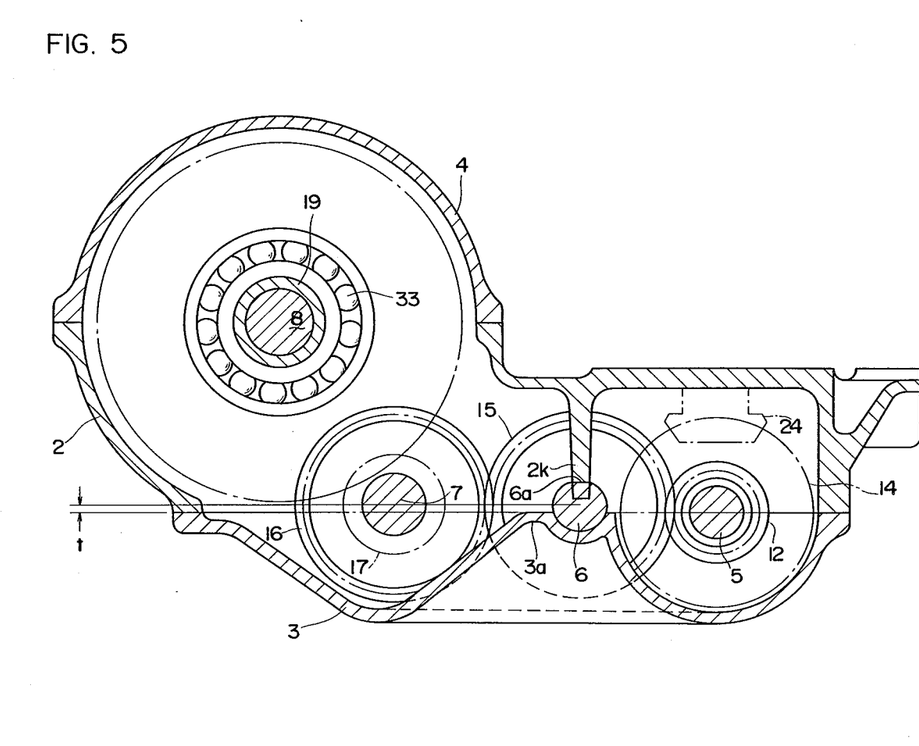
FIG. 5 is a sectional view taken on the line V—V in FIG. 3.
Figure 8:
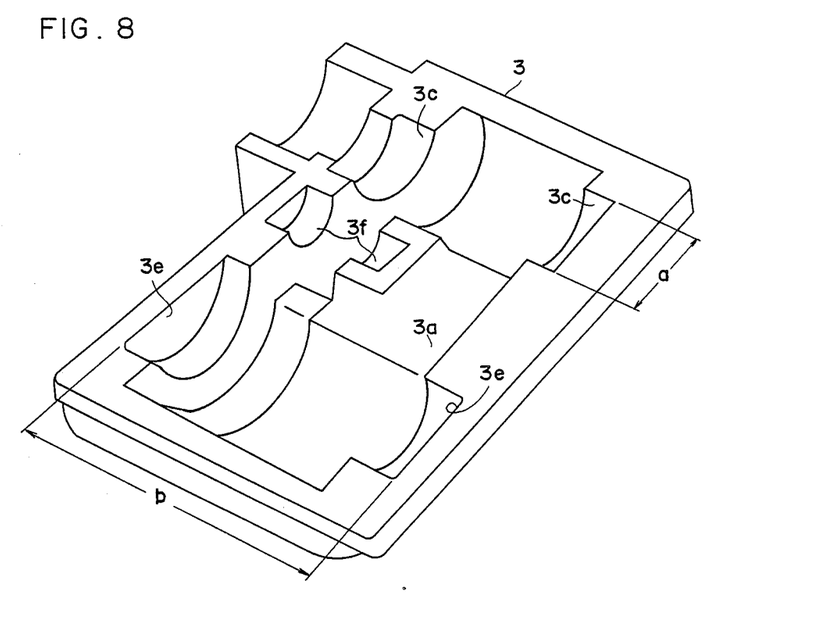
FIG. 8 is a perspective view of the lower case of the invention.
Figure 9:
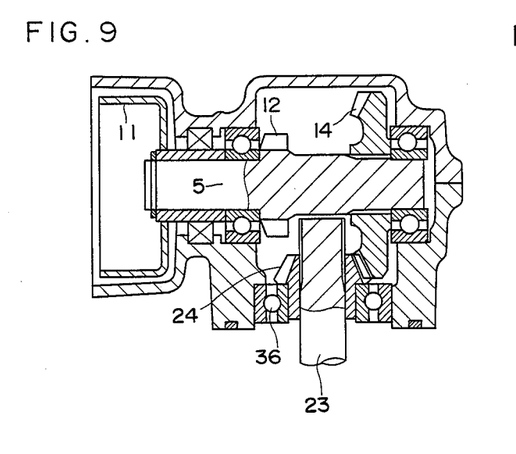
FIG. 9 is a sectional rear view taken on the line IX—IX in FIG. 4.

Next, bearing portions for the driving axles 8L and 8R and the first, second and third shafts of speed reduction gears will be described in accordance with FIGS. 5, 6 and 8.

Figure 6:
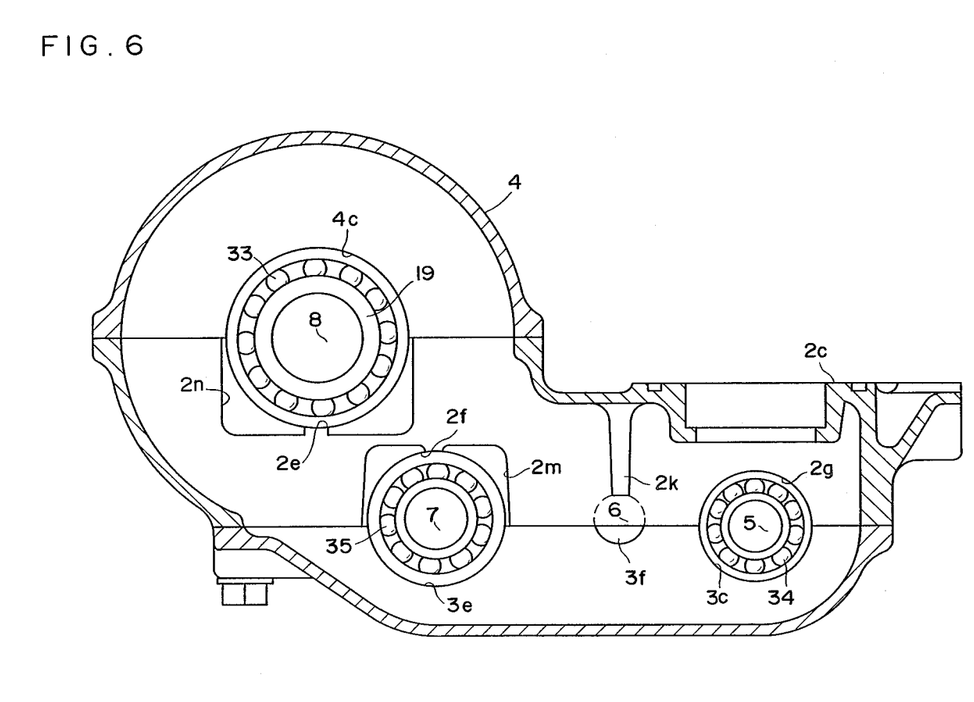
FIG. 6 is a sectional view taken on the line VI—VI in FIG. 3, showing bearing portions of the invention.

At first, referring to FIG. 6, the fixedly sandwiching portion for a bearing 33 supporting thereby both the differential cases 19a and 19b and driving axles 8L and 8R is shown.

Namely, the bearing 33 is held at the outer periphery by the upper case 4 and intermediate case 2, but an error in processing or assembly of the case is created, so that it cannot occur that the semiconductor portions provided at the upper case 4 and at the intermediate case 2 are identical with each other so as to close-contact with the outer periphery of the round bearing 33.

Hence, a bearing contact surface 4c at the upper case 4 is made semicircular to decide the longitudinal position of the bearing 33 by the semicircular contact surface, and a longitudinally adjusting portion 2n formed of a square recess somewhat larger in width than the bearing 33 is formed at the intermediate case 2, the driving axles 8L and 8R being free in the adjusting recess 2n, thereby not regulating the longitudinal position of the bearing 33.

However, a projection 2e projects from the bottom of the square recess 2n and abuts against the outer periphery of the bearing 33, thereby regulating the bearing 33 in its vertical position.

Such construction makes it possible to assemble the differential gear even when the surfaces for the bearing 33 at the upper case 4 and intermediate case 2 do not just meet with each other.

Next, the bearings for the first shaft 5, second shaft 6 and third shaft 7 will be described as follows:

The axis of the first shaft 5 is coincident with the abutting surfaces of intermediate case 2 and lower case 3, the axes of the second shaft 6 and third shaft 7 are disposed upwardly apart from the abutting surfaces only by an interval t. Even if the axes and abutting surfaces are not coincident with each other, the bearings each are fixed by the substantially semicircular recess from below and by a projection from above, thereby being fixedly positioned.

The above construction makes it possible that, even when the gears on the second and third shafts 6 and 7 are larger in diameter than the gear on the first shaft 5, the axes of the second shaft and third shaft 6 and 7 are positioned above the aforesaid abutting surfaces, thereby enabling the lowermost end of each gear on the shaft 6 or 7 to be substantially coincident with that of the gear on the first shaft 5.

Therefore, the bottom of lower case 3 is made horizontally flat, thereby enabling the tractor to be larger in height from the ground.

Next, explanation will be given as the positioning constructions of intermediate case 2 and lower case 3.

Conventionally, the positional relationship between the intermediate case 2 and the lower case 3 has been detected with accuracy by positioning both the cases by a knock pin inserted therebetween.

On the contrary, the present invention enables the accurate positioning without using the knock pin.

In other words, at the junction portion between the intermediate case 2 and the lower case 3, the bearing surfaces 2g and 3c for the first shaft 5 whose axis passes the abutting surface between the cases 2 and 3 are made completely semicircular and longitudinal lengths a of the bearing surfaces 2g and 3c are made equal to an outer diameter of the bearing 34, so that the bearing 34 is fitted into a quite round bearing bore to thereby position with accuracy the intermediate case 2 and lower case 3 longitudinally thereof.

Also, intervals b between the outside surfaces of the adjusting portions 2m for the third shaft 7 provides at the intermediate case 2 and between the outside surfaces of the bearing surfaces 3e at the lower case 3 are formed equal to an interval between the outside surfaces of the bearings 35 disposed at both axial ends of the third shaft 7, so that the bearings 35 are fitted at the outside surfaces thereof onto the adjusting portions and bearing surfaces in relation of abutting against the outside surfaces thereof, thereby leftwardly and rightwardly positioning the bearings.

Since the first shaft 5 is positioned at the bearing 34 portion longitudinally of the tractor body, the bearing 35 carrying portion at the third shaft 7 is required to allow a longitudinal error, whereby the bearing bore at the intermediate case 2 comprises the adjusting portions 2m and projections 2f. Between each adjusting portion 2m and the outer periphery of the bearing 35 is formed a slight longitudinal gap thereby making allowable a longitudinal error at the aforesaid portion.

Next, explanation will be given on the bearing for the second shaft 6 in accordance with FIGS. 2 and 6.

At the lower case 3 is bored a bearing bore 3f in which the second shaft 6 is directly inserted and the free-fitting gear 15 is rotatably supported to the second shaft 6 through a bearing bush.

A cutout 6a is formed at the second shaft 6, so that a projecting wall 2k projecting from the intermediate case 2 abuts against the cutout 6a to thereby retain the rotation of second shaft 6.

The projecting wall 2k is formed not partially at the cutout 2k but also entirely widthwise of the intermediate case 2, thereby retaining a lubricating oil from largely moving between the first shaft 5 and the third shaft 7 supporting portions. In order to improve the effect of retaining the movement of lubricating oil by the projecting wall 2k, the bottom wall at the lower case 3 inwardly projects to form an inwardly swollen bottom wall 3a so as to restrict a space between the projecting wall 2k and the swollen bottom wall 3a.

Thus, the aforesaid construction restrains the lubricating oil from largely moving to thereby eliminate a one-sided flow thereof.

Figure 7:
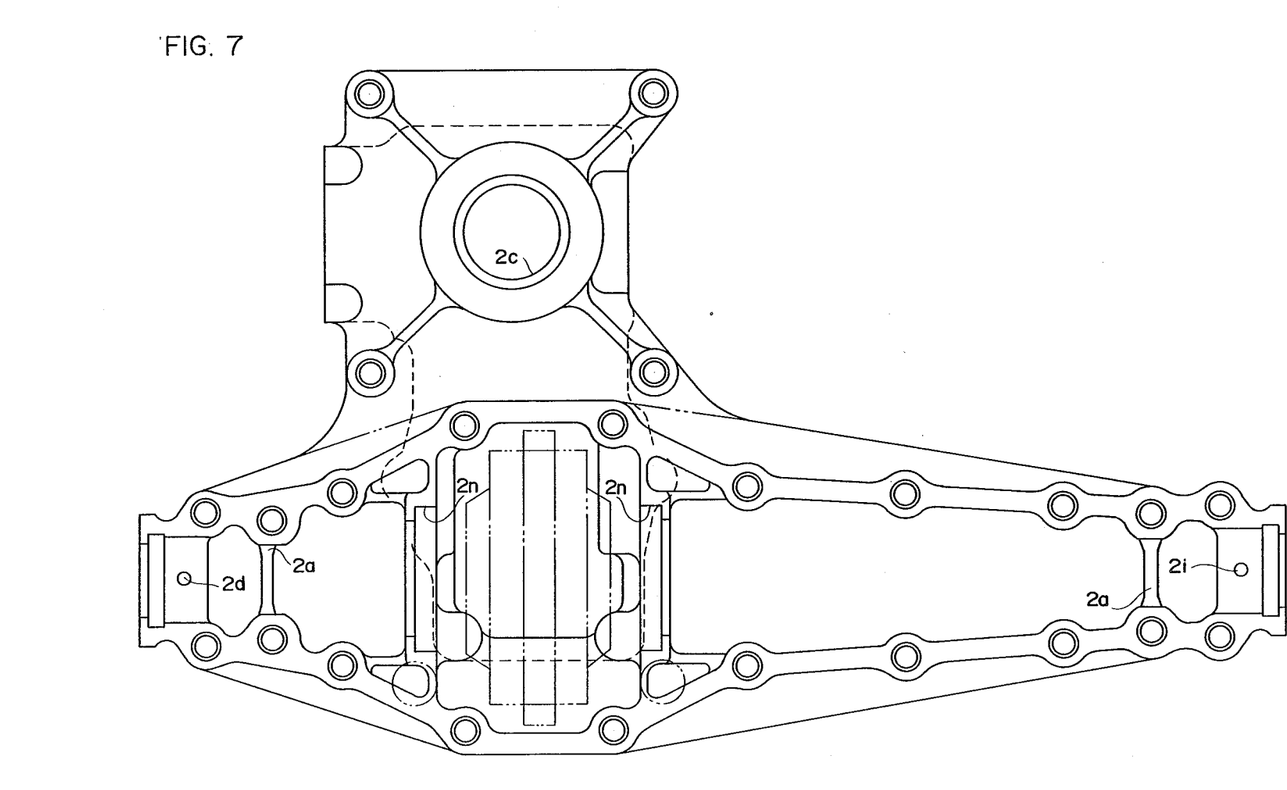
FIG. 7 is a plan view of the intermediate case of the invention.

Next, explanation will be given on the lubrication construction of the bearings for the driving axles 8L and 8R in accordance with FIGS. 3 and 7.

The right-hand and left-hand differential gear cases 19a and 19b are the same in configuration so that both the cases 19a and 19b are jointed, after charging therein grease or lubricant to keep the interior tightly closed.

Thus, the differential side gears 21L and 21R, differential pinions 22 and differential pinion shaft 20 disposed within the sealed differential cases 19a and 19b are lubricated with the charged grease. Also, the support surfaces for the freely-fitted driving axles 8L and 8R are lubricated with the same.

As shown in FIG. 3, the bearings 33 are fitted and supported onto the laterally outer peripheries of the differential gear cases 19a and 19b and the laterally inner peripheries thereof serve as the bearing surfaces to bear the driving axles 8L and 8R respectively.

Hence, the outside of each driving axle 8L or 8R is partitioned from the differential gear at each bearing 33.

The differential gear is lubricated at the outside with the lubricating oil staying at part of intermediate case 2 or lower case 3 and at the inside with the aforesaid grease. The exterior of each bearing for each driving axle 8L or 8R, especially each bearing bush 9, not lubricated with the oil due to the aforesaid partition has been supplied with grease separately charged during the assembly.

In order to block a flow-out of grease from the grease lubricating portions, band-like projections 4a project radially inwardly from the inner surface of the upper case 4 and band-like projections 2a project radially inwardly from the inner surface of the intermediate case 2 and are opposite to the projections 4a respectively, the projection edges of both projections 4a and 20 connecting with each other, thereby forming oil or lubricant reservoir edges each extending throughout the entire inner periphery of the upper and intermediate cases 4 and 2.

Since the bearing bushes 9 and bearings 33 are supported at the abutting surfaces of the upper case 4 and intermediate case 2, the grease is easy to charge therein during the assembly. Hence, the traveling transmission can sufficiently and simply be lubricated by the grease without forming an oil bath of a large amount of lubricant oil for the entire traveling transmission as the conventional.

In addition, mounting portions, through which the traveling transmissions are mounted on frames L, are formed at the outer peripheries of the intermediate case 2 and upper case 4 and at the position corresponding to the projections 2a and 4a respectively, and each radially inwardly projecting edge 2a or 4a serves also as a reinforcement rib.

Figure 10:
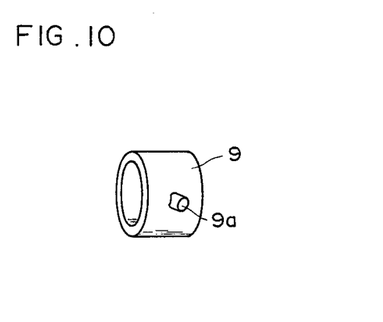
FIG. 10 is a perspective view of a bearing bushing for a driving axle.

Referring to FIG. 10, each bearing bush 9 is molded with a sintered alloy and an engaging projection 9a is molded simultaneously. The engaging projection 9a is fitted into an engaging bore 2d at the intermediate case 2, thereby locking the bearing bush 9.

Next, explanation will be given on constructions of an oil filter 47 and a differential locking device mountable on the traveling transmission of the invention in accordance with FIGS. 11 through 15.

Figure 13:
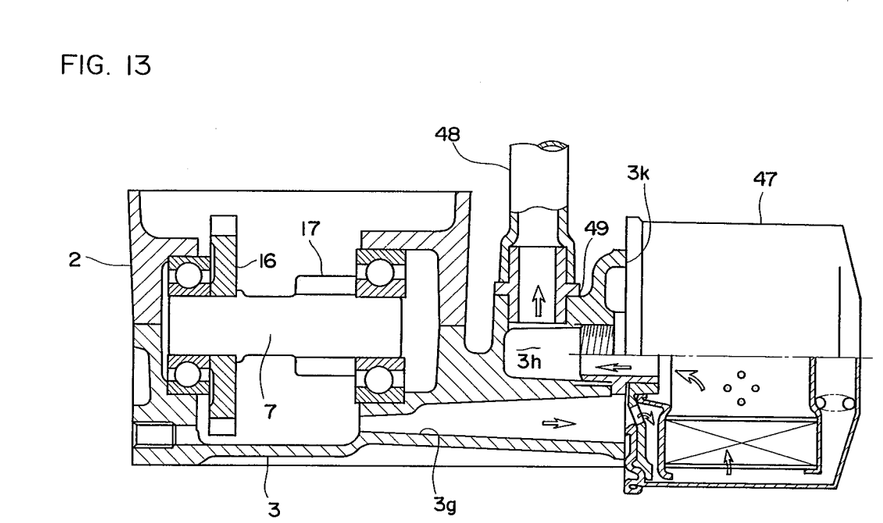
FIG. 13 is a sectional rear view of the same, showing an oil filter.
Figure 14:
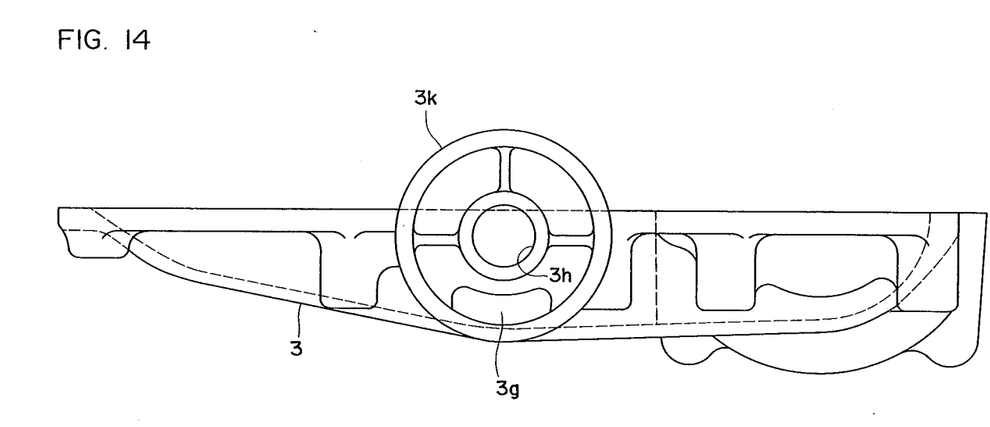
FIG. 14 is a side view of a lower case of the same.
Figure 15:
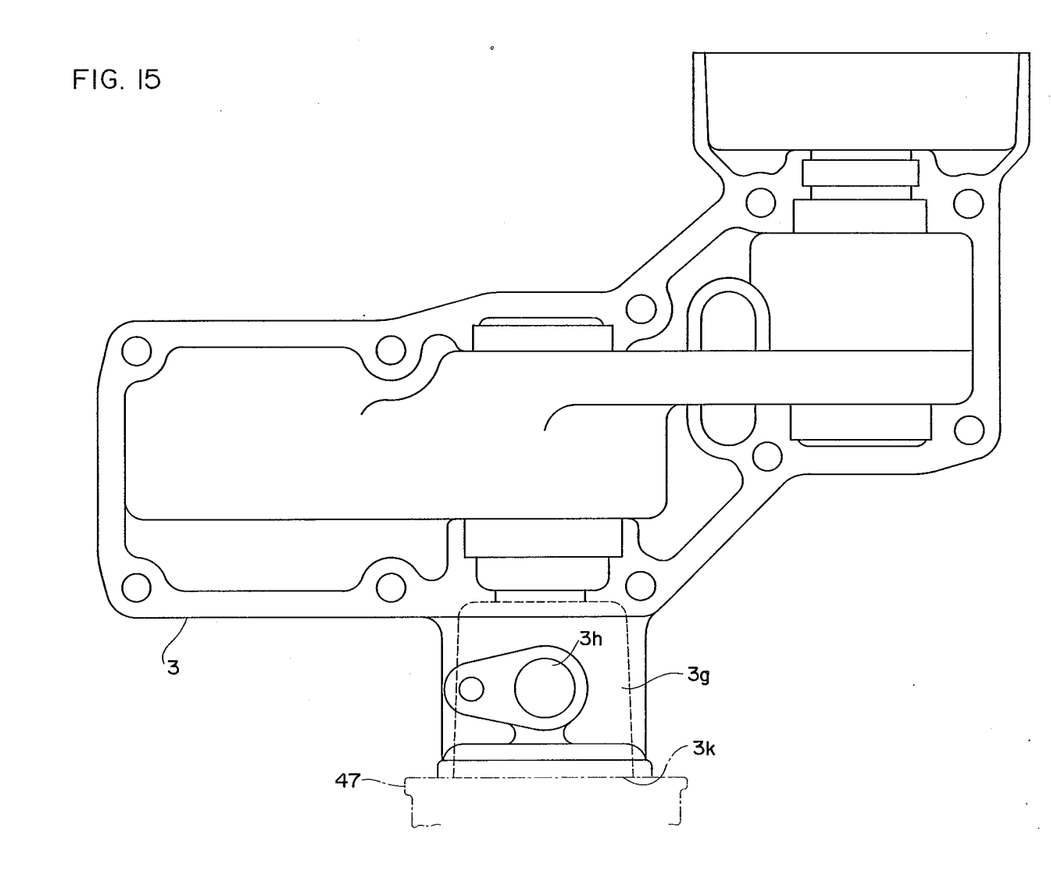
FIG. 15 is a plan view of the lower case of the same.

The oil filter 47 is mounted especially on a filter mounting base 3k formed at the lower case 3.

In other words, the filter mounting base 3k projects from the lateral side of an intermediate portion of the lower case 3, at the position not-overlapping with the intermediate case 2, and above the abutting surfaces of the intermediate case 2 and lower case 3.

Also, the lowermost end of the filter mounting base 3k is positioned higher than the bottom of the lower case 3 so that the traveling transmission is larger in height from the ground.

The filter mounting base 3k is provided therein with a suction oil-passage 3g for guiding a lubricating oil within the lower case 3 to the oil filter 47 and with a derivation oil-passage 3h for guiding the lubricating oil after filtrated by the oil filter 47, the derivation oil-passage 3h being coupled with piping 48 through a joint 49, the lubricating oil being guided to the hydraulic pump shaft 1 at the HST system transmission H through the piping 48.

Next, explanation will be given on the differential locking device.

Figure 11:
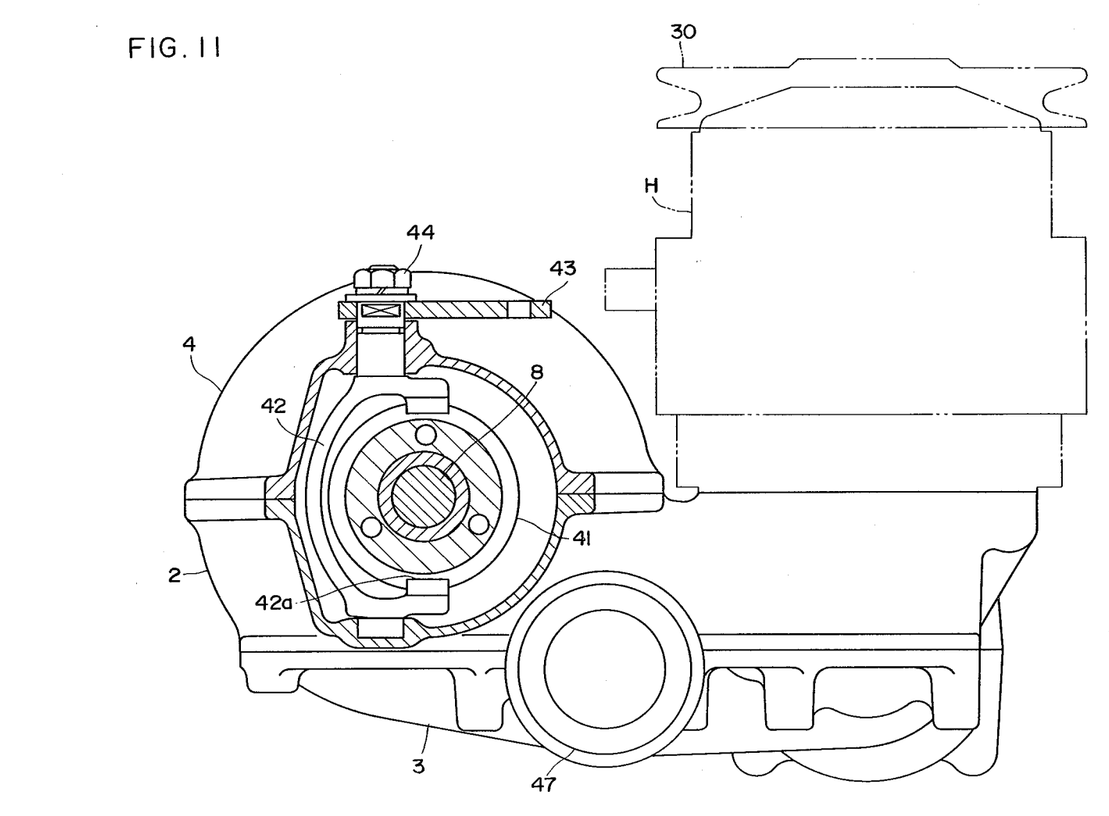
FIG. 11 is a partially sectional side view of a modified embodiment of the invention which is provided with a differential locking device attached to the differential gear and at the lower case with an oil filter attached thereto.
Figure 12:
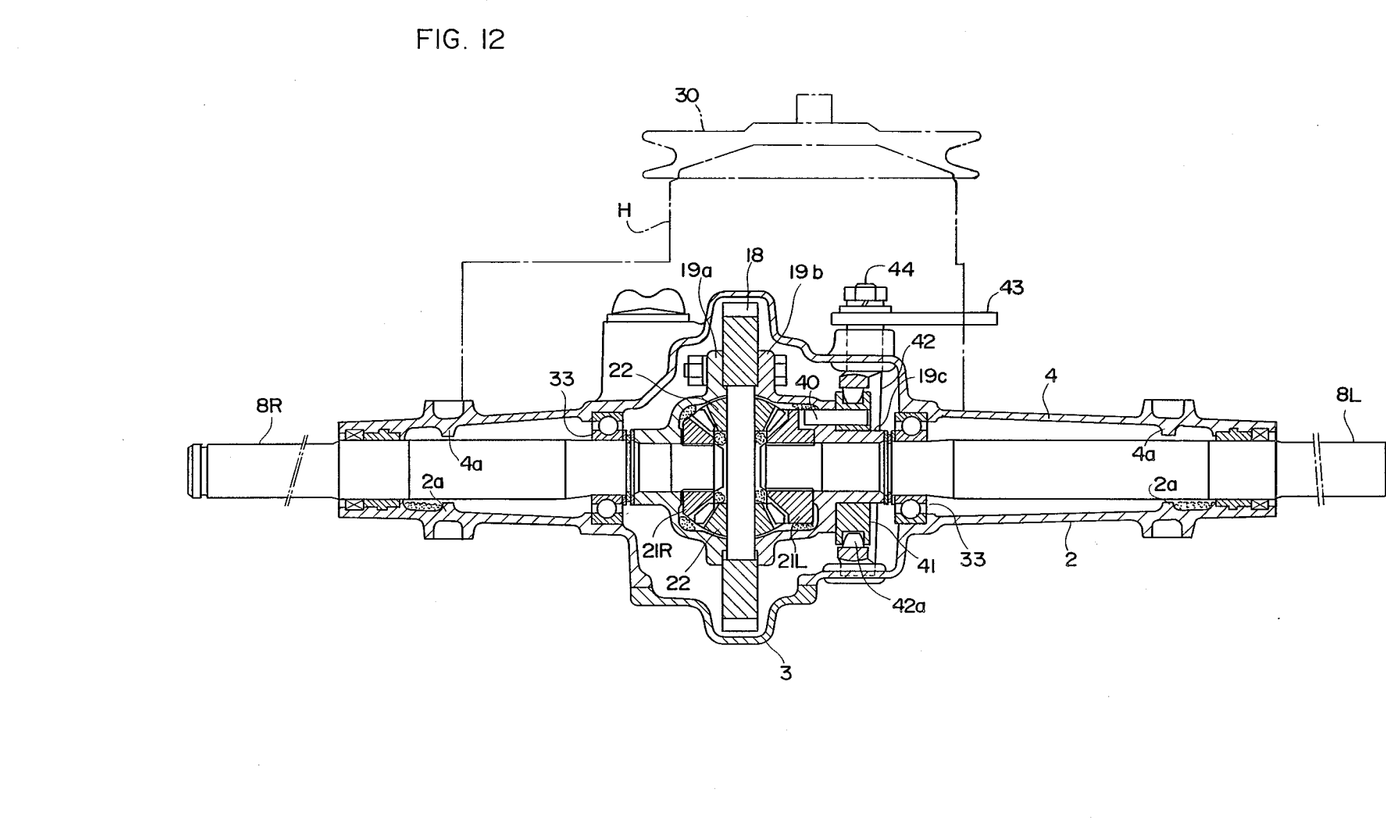
FIG. 12 is a sectional front view of the FIG. 11 embodiment.

The differential locking device, along with the differential gear, is put between the intermediate case 2 and the upper case 4 during the assembly, thereby enabling easy assembly of the differential locking device.

In other words, a differential lock slider 41 slides on a sliding surface 19c provided at a differential gear case 19b and retains the differential side gears 21L and 21R and differential gear case 19, thereby ceasing the operation of differential gear device.

The differential lock slider 41 is slidable by a differential lock shifter 42, engaging levers 42a each round in section and are fitted freely in grooves at the differential locking slider 41, a differential lock arm 43 rotates to allow the differential lock shifter 42 to rotate through an arm shaft 44, thereby allowing the differential lock slider 41 to slide.

In the present invention, the differential locking device can be assembled simultaneously with assembly of the upper case 4 and the intermediate case 2 which are divided from each other by the line passing the axes of the driving axles 8L and 8R.

In other words, both the upper and lower ends of the differential locking shifter 42 are pivotally inserted into bores at the upper case 4 and intermediate case 2, and one pivot portion projects to serve as the arm shaft 44, so that a differential locking arm 43 is attached to the utmost end of the arm shaft 44.

While a preferred embodiment of the invention has been described using specific terms, such description is for illustrative purpose only, and it is to be understood that changes and variations may be made without departing from the spirit or scope of the following claims.

What is claimed is:

1. A traveling transmission for a light tractor or the like, comprising:

a transmission case housing a differential gear and a plurality of speed reduction gears;

said transmission case having an inner surface and an outer surface and being divided horizontally into three sections, an upper section, an intermediate section located below said upper section, and a lower section located below said intermediate section, whereby said transmission case sections are joined together;

an outer surface of said intermediate section being provided, adjacent the junction of said upper section with said intermediate section, with a hydrostatic transmission system, said intermediate section also being provided with a first opening for receiving said differential gear;

said differential gear including at least one driving axle;

said axle being received within said first opening of said intermediate section, and being supported within said transmission case between said upper section and said intermediate section;

said intermediate section further including a second opening, adjacent the junction of said lower section with said intermediate section, for receiving said speed reduction gears;

said speed reduction gears including a plurality of gear shafts being received within said second opening and being supported within said transmission case between said intermediate case and said lower case.

2. A traveling transmission as set forth in claim 1, wherein one said side surface of said lower section has formed integrally therewith, an oil filter mounting base, said filter mounting base being bored with a suction oil passage for taking in oil from said lower section and guiding such oil to a filter mounted at said filter mounting base, and a derivation oil passage for delivering filtered oil to a hydraulic pump located adjacent said hydro-static transmission system.

3. A traveling transmission as set forth in claim 1, further comprising a differential locking device, wherein said device includes a differential lock slider located along a sliding surface provided at one side of a differential gear case housing said differential gear, said sliding surface capable of retaining side gears fitted onto said driving axles, a shifter, engageable with a groove provided at the outer periphery of said differential lock slider is provided with an arm shaft which projects outwardly from said traveling transmission case and has mounted thereon a differential locking arm for activating the differential locking device.

4. A traveling transmission, as set forth in claim 1, further comprising:

first semi-circular bearing surfaces formed on the inner surface of said intermediate section and said lower section;

said bearing surfaces forming a first bearing bore when said intermediate case and lower case are joined;

said first bearing bore being adapted to receive bearing elements disposed along a first gear shaft of said speed reduction gears, whereby said first shaft includes an axis located substantially coincident with the joint of said intermediate section and said lower section.

5. A traveling transmission, as set forth in claim 4, wherein the longitudinal length of said first semi-circular bearing surfaces is substantially identical with the outer diameter of said bearing elements, whereby joining of the intermediate section to the lower section is facilitated.

6. A traveling transmission, as set forth in claim 4, further comprising:

a second gear shaft of said speed reduction gears, said second shaft supporting a freely rotatable gear and including a cut out portion;

a second semi-circular bearing surface for supporting said second shaft being formed on the inner surface of said lower section; and a projection extending from the inner surface of said intermediate section towards said lower section, whereby said projection abuts against the cutout portion of said second shaft, thereby preventing lubricant located within said case, from moving between said first shaft and a third shaft of said speed reduction gears.

7. A traveling transmission as set forth in claim 4, further comprising:

a third semi-circular bearing surface formed on the inner surface of said lower section; and a generally square recessed bearing surface formed on the inner surface of said intermediate section, whereby said bearing surfaces form a third bearing bore for supporting bearing elements located at the ends of said third gear shaft of said speed reduction gears.

8. A traveling transmission as set forth in claim 7, wherein the interval between the bearing elements of said third shaft is equal to the interval between the bearing surfaces of said third bearing bores.

9. A traveling transmission, as set forth in claim 1, wherein said transmission case further comprises:

a differential gear case located within said transmission case;

said differential gear case housing said differential gear and being divided vertically into right hand and left hand differential gear cases; and a differential pinion shaft and a ring gear located within said differential gear case at the abutment of said right and left hand gear cases.

10. A traveling transmission, as recited in claim 1, wherein said transmission case is divided horizontally into three sections at two planes;

one plane passing through the axis of at least one shaft of said speed reduced gears;

the outer plane passing through the axis of said at least one driving axle of said differential gear.

11. A traveling transmission, as set forth in claim 1, wherein said hydro-static transmission system further comprises a motor shaft projecting from said system into said intermediate case at said loading surface, whereby rotation of said motor shaft is transmitted from at least one of said speed reduction gears to said differential gear.

12. A traveling transmission for a light tractor or the like comprising;
- a transmission case housing a differential gear and a plurality of speed reduction gears;
- said transmission case having an inner surface and an outer surface and being divided horizontally into three sections, an upper section, an intermediate section located below said upper section, and a lower section located below said intermediate section, wherein said transmission case sections are joined together;
- an outer surface of said intermediate section being provided, adjacent the junction of said upper section with said intermediate section, with a hydrostatic transmission system, said intermediate section also being provided with a first opening for receiving said differential gear;
- said differential gear including at least one driving axle;
- said axle being received within said first opening of said intermediate section, and being supported within said transmission case between said upper section and said intermediate section;
- said intermediate section further including a second opening, adjacent the junction of said lower section with said intermediate section, for receiving said speed reduction gears;
- said speed reduction gears including a plurality of gear shafts being received within said second opening and being supported within said transmission case between said intermediate case and said lower case, wherein said differential gear includes two driving axles;
- said axles projecting laterally from said transmission case between said upper section and said intermediate section; and
- bearings mounted on the inner surface of said upper and intermediate sections for supporting said driving axles.

13. A traveling transmission, as recited in claim 12 further comprising:
- a lubricant, wherein said upper section and said intermediate section further comprise means projecting inwardly from the inner surface thereof, towards said driving axles, to maintain said lubricant in a predetermined area of said transmission case.

14. A traveling transmission, as recited in claim 13, wherein said means to maintain said lubricant further comprises:
- two band-like projections extending radially inward from opposite inner surfaces of said upper section and said intermediate section, to form a lubricant reservoir edge about the radius of said driving axles.

* * * * *

UNITED STATES PATENT AND TRADEMARK OFFICE
CERTIFICATE OF CORRECTION

PATENT NO. : 4,867,008
DATED : September 19, 1989
INVENTOR(S) : Yamaoka, et al.

It is certified that error appears in the above-identified patent and that said Letters Patent is hereby corrected as shown below:

Column 1, line 29, after "like", insert --,--;

Column 2, line 66, delete "caes" and insert --cases-- therefor;

Column 3, line 38, after "left-hand" insert --gear--;
line 58, delete "semicon ductor" and insert --semicircular-- therefor;

Column 4, line 52, delete "provides" and insert --provided-- therefor;

Column 7, line 43, delete "said", first occurance; and

Column 8, line 60, delete "outer" and insert --other-- therefor.

Signed and Sealed this

Second Day of October, 1990

Attest:

HARRY F. MANBECK, JR.

*Attesting Officer*   *Commissioner of Patents and Trademarks*